United States Patent [19]

Meisenheimer, Jr.

[11] Patent Number: 4,980,675

[45] Date of Patent: Dec. 25, 1990

[54] TEMPERATURE COMPENSATIBLE PRESSURE MONITOR AND SENSOR CONSTRUCTION

[75] Inventor: Daniel T. Meisenheimer, Jr., Orange, Conn.

[73] Assignee: Spectrum Associates, Milford, Conn.

[21] Appl. No.: 462,725

[22] Filed: Jan. 9, 1990

[51] Int. Cl.$^5$ .................. G08B 21/00; H01H 35/40; G01L 19/04

[52] U.S. Cl. .................. 340/626; 73/708; 73/729; 200/83 C; 200/83 J

[58] Field of Search ............ 340/626; 73/708, 729; 200/83 C, 83 J

[56] References Cited

U.S. PATENT DOCUMENTS

| | | | |
|---|---|---|---|
| 3,472,077 | 10/1969 | Bucalo | 73/708 |
| 3,850,039 | 11/1974 | Brakebill | 73/708 |
| 4,063,057 | 12/1977 | Meisenheimer, Jr. | 340/626 |
| 4,198,867 | 4/1980 | Olsen | 73/708 |
| 4,524,624 | 6/1985 | DiNola et al. | 73/708 |
| 4,612,811 | 9/1986 | Sarasohn | 73/708 |
| 4,630,028 | 12/1986 | Kelly et al. | 200/83 C |
| 4,654,643 | 3/1987 | Meisenheimer, Jr. | 340/626 |
| 4,655,087 | 4/1987 | Rozniecki | 73/708 |
| 4,697,643 | 10/1987 | Sassier | 340/626 |
| 4,782,703 | 11/1988 | Nishi | 73/708 |

*Primary Examiner*—Joseph A. Orsino
*Assistant Examiner*—Kinfe-Michael Negash
*Attorney, Agent, or Firm*—Melvin I. Stoltz

[57] ABSTRACT

By providing pressure-responsive switch-actuation means constructed for being substantially unaffected by temperature changes, a pressure sensor is attained which is capable of monitoring pressure levels with precision, regardless of the ambient temperature to which the system is subjected. By employing temperature insensitive material to effectively compensate for temperature changes incurred by the remaining sensor components, the actuation control assembly of the sensor is capable of achieving precision monitoring of desired pressure levels regardless of changes in the ambient temperature to which the monitor assembly is exposed. In one preferred embodiment, the pressure sensor of the present invention incorporates a uniquely constructed, machined bellows which further enhances and provides precision pressure sensing capabilities.

19 Claims, 1 Drawing Sheet

FIG. 1
FIG. 2
FIG. 3
FIG. 4
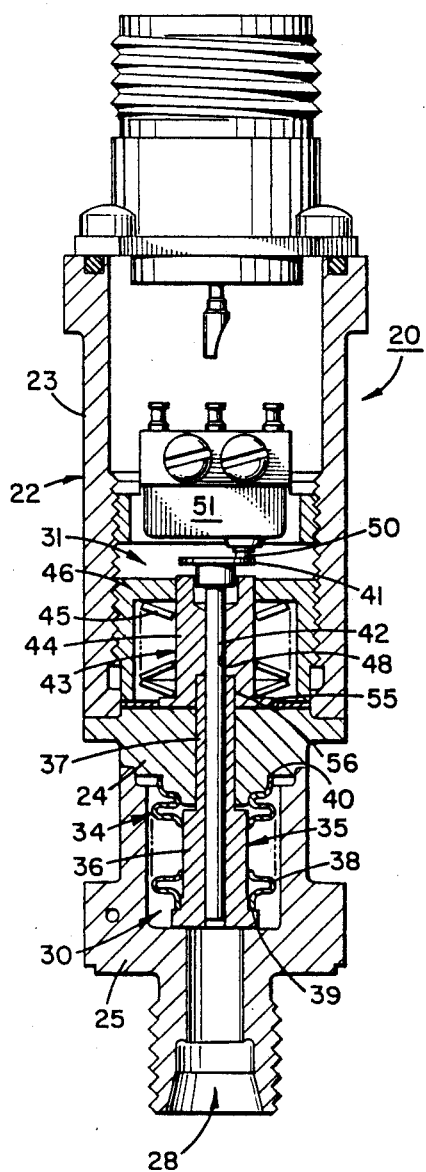
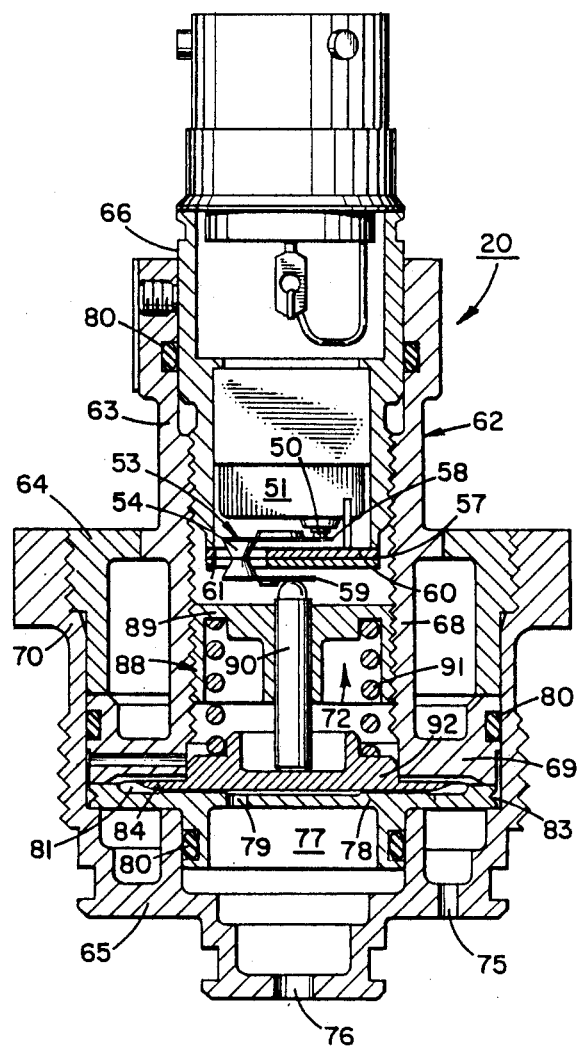
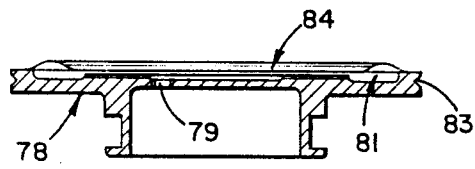
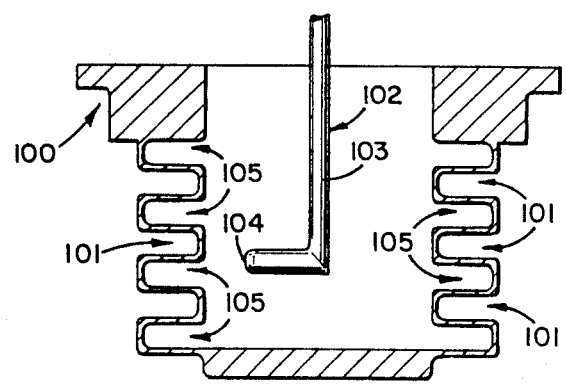

TEMPERATURE COMPENSATIBLE PRESSURE MONITOR AND SENSOR CONSTRUCTION

TECHNICAL FIELD

This invention relates to pressure sensor constructions and more particularly to precision pressure sensors constructed for continuous, accurate monitoring throughout repeated exposure to substantial temperature differentials.

BACKGROUND ART

Pressure sensing or monitoring devices are frequently employed in a wide variety of systems and equipment. In particular, vehicles and equipment employed in aerospace equipment and in ground and sea transportation or control applications require constant monitoring of specific pressure levels to assure continuous trouble-free operation of various components and systems.

Due to the variety of components typically being monitored, and the wide variety of applications and uses to which such equipment is subjected, the monitoring equipment is repeatedly exposed to substantial temperature changes. As a result, any pressure sensor or monitor must be constructed in a manner which will assure continuous, trouble-free operation regardless of the temperature changes to which the monitoring equipment is exposed. However, in spite of the requirement that pressure sensors or monitors should be capable of withstanding severe temperature changes, many prior art systems are incapable of providing the desired level of repeatable, reliable precision pressure monitoring under all such adverse conditions.

Typically, when exposed to broad changes in ambient temperatures, prior art pressure sensors or monitors are incapable of continuously functioning within a limited tolerance range. Although these prior art pressure sensors are completely capable of effectively operating and monitoring pressure levels or pressure changes at normal, standard ambient conditions, the exposure to substantial environmental changes causes the components of the pressure sensor to change, due to expansion or contraction. As a result of such and other physical changes within the pressure sensor itself, the pre-set thresholds originally incorporated into the sensor during its production are affected, causing actuation of the pressure sensor under conditions which substantially exceed the tolerances for proper operation of the pressure sensor.

Therefore, it is a principal object of the present invention to provide a pressure sensor or monitor which is capable of continuously monitoring pressure levels within limited tolerance ranges regardless of changes in the ambient temperature to which the sensor is exposed.

Another object of the present invention is to provide a pressure sensor or monitor having the characteristic features described above which is reliable and capable of repeatably functioning within the desired, pre-set, limited actuation standards or tolerances regardless of the temperature at which the sensor must perform.

Another object of the present invention is to provide a pressure sensor or monitor having the characteristic features described above which is constructed for rugged, long-term repeated use and for enduring substantially severe environmental conditions, without negatively affecting its operation or precision monitoring capabilities.

Another object of the present invention is to provide a pressure sensor or monitor having the characteristic features described above which is capable of being manufactured at a reasonable price.

Other and more specific objects will in part be obvious and will in part appear hereinafter.

SUMMARY OF THE INVENTION

The present invention overcomes the prior art limitations and drawbacks by providing a pressure sensor which effectively compensates for temperature changes by having the principal pressure-responsive switch-actuation means constructed to be insensitive or unaffected by temperature changes. In this way, substantial changes in the ambient temperature do not cause the principal actuation member to expand or contract. As a result, the pressure sensor of the present invention is capable of continuously operating within the precise, limited pressure sensing tolerances to which the system was originally set, regardless of (a) repeated exposure to substantial temperature differentials, (b) the temperature at which the sensor must operate, or (c) the effects the temperature changes have on the remaining components of the sensor.

In the preferred embodiment, one principal component of the actuation assembly of the present invention comprises an elongated rod constructed for axial translation in response to the changes in pressure being monitored. By constructing this elongated, axially translatable rod from temperature resistant material, such as invar or nickel steel, temperature changes fail to cause the rod to expand or contract to any measurable degree. Consequently, the differences in the contraction or expansion of the sensor's other component parts and the effect caused by temperature changes on spring rates and sensing characteristics are selectively compensated by the present invention.

By employing the temperature insensitive rod, it has been found that the original, pre-set conditions under which the rod is to activate the pressure sensor of the present invention are maintained regardless of the ambient temperature to which the pressure sensor is exposed. In this way, precision pressure monitoring is achieved for closely defined tolerance ranges under virtually all temperature conditions, without erroneous readings or failed readings being obtained.

By employing the unique temperature compensated pressure sensor construction of the present invention, a precision pressure sensor is obtained for monitoring either specific pressure levels or differential pressure levels, under conditions which previously required specialized expensive monitoring equipment for precision monitoring.

In one particular configuration wherein precision pressure levels are being monitored, the preferred embodiment of the present invention incorporates the rod construction detailed above, along with a spring biased bellows construction for maintaining the desired offsetting pressure levels. By incorporating a bellows construction at one end of the elongated actuation assembly, the inherent temperature changes occurring within the remaining assembly are fully compensated, and the precisely desired pressure calibration is maintained.

In addition, the present invention preferably also incorporates a unique machined bellows constructions which is capable of providing a precision-made bellows configuration specifically constructed to achieve a particular axial resistance, while also capable of being made in controlled miniature configurations with simplicity and ease. In this way, a "tailor-made" bellows construction is attained for small and miniature components, which is capable of being manufactured with any desired spring rate or multiple rates, while also being comparatively inexpensive.

The invention accordingly comprises the features of construction, combination of elements and arrangement of parts which will be exemplified in the constructions hereinafter set forth, and the scope of the invention will be indicated in the claims.

THE DRAWINGS

For a fuller understanding of the nature and objects of the present invention, reference should be had to the following detailed description taken in connection with the accompanying drawings in which:

FIG. 1 is a cross-sectional elevational view, showing one embodiment of the pressure sensor of the present invention monitoring a single pressure source;

FIG. 2 is a cross-sectional elevational view showing an alternate embodiment of the pressure sensor incorporating the teaching of the present invention for monitoring differential pressures; FIG. 3 is a cross-sectional enlarged elevational view showing the diaphragm mounting system for the embodiment of FIG. 2; and FIG. 4 is a cross-sectional elevational view showing the preferred bellows construction of the present invention in the process of being manufactured.

DETAILED DISCLOSURE

In FIG. 1, pressure sensor 20 is shown incorporating the teaching of the present invention. In this embodiment, pressure sensor 20 is constructed for monitoring a pressure level within a pre-set range, and for providing an output warning signal to a remote location whenever the pressure being monitored falls below the pre-set range.

In this embodiment, pressure sensor 20 incorporates housing 22, which comprises upper housing portion 23, intermediate housing portion 24, and lower housing portion 25. Preferably, housing portions 23, 24, and 25 are welded together, at their juncture zones in order to form a substantially integral housing assembly 22.

Lower housing portion 25 incorporates inlet port 28 constructed for being threadedly interconnected with the source of the pressure being monitored by sensor 20. As shown in FIG. 1, inlet port 28 extends through lower housing 25 communicating with chamber 30. Upper housing 23 incorporates a chamber 31 formed therein, while intermediate housing portion 24 incorporates a through hole or channel substantially centrally disposed therein and extending between chambers 30 and 31.

In the embodiment depicted in FIG. 1, sensor 20 is constructed for monitoring pressure levels. In order to provide the desired pressure precision monitoring, pressure sensor 20 incorporates temperature-compensating spring-biased, bellows operated pressure sensing assembly 34. In the preferred embodiment, temperature compensating pressure-sensing assembly 34 incorporates a substantially cylindrically shaped, elongated holder 35 which comprises a base portion 36 and an elongated tubular portion 37 which is integrally connected to and forms a part of holder 35.

Base portion 36 is contained within chamber 30 of lower housing 25, and preferably, tubular portion 37 is co-axially aligned with base portion 36 and is mounted within elongated centrally disposed channel 32 of intermediate housing 24 for axial movability through channel 32. In addition, tubular portion 37 and base portion 36 of holder 35 incorporate an elongated bore co-axially formed therein and extending substantially the entire length of holder 35.

Pressure sensing assembly 34 also incorporates a bellows 38 which peripherally surrounds base portion 36 of holder 35, embracing substantially the entire outer peripheral surface thereof. First terminating end 39 of bellows 38 is brazed or welded directly to base portion 36, in order to provide the desired resistance to the axial movability thereof. The opposed end 40 of bellows 38 is brazed or welded to intermediate housing portion 24. Terminating end 40 of bellows 38 represents the fixed end thereof, while end 40 comprises the movable end of bellows 38, responding to the axial movement of holder 35.

Temperature-compensating, pressure-sensing assembly 34 of sensor 20 of the present invention also comprises an elongated temperature-insensitive actuating rod 42 which extends from upper chamber 31 to lower chamber 30. As shown in FIG. 1, elongated actuating rod 42 is securely retained in the elongated bore extending through substantially the entire length of holder 35. In the preferred embodiment, rod 42 is secured at the bottom of the axial bore formed in base portion 36 of holder 35, while the remainder of the bore of holder 35 comprises a diameter slightly greater than the outer diameter of rod 42. In this way, expansion or contraction of rod 42 compensates.

Temperature-compensating, pressure-sensing assembly 34 is completed by mounting contact plate 41 to the free end of elongated rod 42. In this position, plate 41 is supportingly retained in cooperating relationship with switch button 50 of switch means 51. Switch means 51 is securely, retained in upper housing 23 and is connected to a remote location to provide an alarm signal whenever switch button 50 is activated.

As is more fully detailed below, once the pressure source is connected for monitoring, pressure sensing assembly 34 moves axially towards switch means 51 when the pressure level in port 28 increases and moves axially away from switch means 51 when the pressure level decreases. In order to control the axial movement of pressure sensing assembly 34, and assure that switch button 50 is activated only when a desired pressure range is not being sensed, the spring forces of both bellows 38 and biasing spring assembly 43 are controllably employed.

In order to provide the required counteracting biasing force for pressure sensing assembly 34, upper chamber 31 of upper housing 23 incorporates biasing spring assembly 43. As shown in FIG. 1, biasing spring assembly 43 comprises spring retainer 44, movable collar 46, and spring means 45 mounted therebetween and peripherally surrounding retainer 44.

In the preferred embodiment, spring means 45 comprise a plurality of disc springs, which are mounted about retainer 44 under compression, with the lower end of the spring members being supportingly retainingly engaged by an outwardly extending flange 55 of retainer 44. In addition, collar 46 peripherally surrounds the upper end of retainer 44 and securely retains the opposed end of spring means 45. Also, collar 46 is threadedly engaged with the inside surface of upper chamber 31 for axial movement relative thereto.

Since collar 46 is threadedly engaged with the inner wall of upper housing 23, the pressure exerted by spring means 45 on retainer 44 is easily increased or decreased by rotating collar 46 relative to housing 23. In this way, as is more fully detailed below, the actuating pressure for sensor 20 is precisely adjusted and calibrated.

In order to assure the axial movability of rod 42, retainer 44 incorporates an axially extending bore which is aligned with the bore formed in holder 35. In this way, elongated rod 42 extends through both retainer 44 and holder 35.

In addition, rod receiving bore 48 of retainer 44 is constructed with a diameter greater than the diameter of rod 42 in order to assure the free axial movability of rod 42 relative to bore 48. In addition, by having bore 48 sufficiently greater than the diameter of rod 42, any expansion or contraction of retainer 44 or rod 42 can be easily accommodated, without causing any adverse or unwanted effects.

By employing this construction, pressure sensor 20 of the present invention continuously monitors the level of the pressure at port 28 to assure that the pressure remains within a specific, desired, pre-set range. If the pressure being monitored falls below the desired pressure range, switch button 50 is activated, causing a signal to be delivered to a remote location to inform the user that the pressure at port 28 has fallen below the desired level. In normal operation with the desired pressure level present, switch button 50 is activated and provides a signal indicating that the pressure being monitored is in its normal operating range.

To attain the desired precision, pressure monitoring of this embodiment, the axial movement of pressure sensing assembly 34 is carefully controlled. As mentioned above, one part of this control is provided by bellows 38 which imparts a specific spring force resistance against the axial movement of base portion 36 of holder 35.

By employing this construction, holder 36 is forced to move axially either towards or away from switch means 51 in order to cause elongated rod 42 to move axially towards or away from switch button 50. Since plate 41 is in contact with switch button 50 when switch button 50 is in its "normal", activated position when the desired pressure level is present, any loss of pressure allows the spring forces to move rod 42 out of contact with switch button 50, causing switch button 50 to be placed into its "alarm" condition, indicating that the pressure level has fallen below the desired operating limits.

In addition to the spring forces imposed upon holder 35 by bellows 38, holder 35 must also compensate for the forces imposed thereon by spring biasing assembly 43. As shown in FIG. 1, the free end of tubular portion 37 of holder 35 is mounted in nested engagement within receiving zone 56 of retainer 44. The spring force established by biasing assembly 43 also controls the axial movement of rod 42 by the engagement between retainer 44 and rod holder 35.

In order to provide sensor 20 with a precision, pre-set pressure threshold at which switch button 50 will be activated, collar 46 of spring biasing assembly 43 is employed. By rotating collar 46 relative to upper housing 23, the biasing forces being exerted upon retainer 44 by spring means 45 are increased or decreased. By connecting sensor 20 to a known pressure source, the forces imposed by both bellows 38 and spring biasing assembly 43 are balanced and the precise pressure threshold level for activating sensor 20 is set.

Once sensor 20 has been properly set for operation, the application of the source pressure causes rod 42 to advance towards switch means 51, bringing plate 41 into contact with switch button 50. This contact causes switch button 50 to move into its "normal", activated position, ready for pressure monitoring. As long as the source pressure remains within the desired operating range, this "normal" condition continues to be monitored at the remote location.

However, if the pressure level being monitored drops below the desired threshold level, the spring forces imposed by bellows 38 and spring biasing assembly 43 causes holder 35 to move axially away from switch means 51. This axial movement causes elongated rod 42 to move axially away from switch means 51, causing contact plate 41 to move away from switch button 50. This movement causes switch button 50 to move from its "normal" position into its alarm position, indicating at the desired remote location that a low pressure level has been sensed. The reverse is true for sensing increasing pressure calibration levels.

In order to provide precision pressure monitoring, the actual axial distance through which elongated rod 42 and holder 35 actually move are small. Clearly, the greater the axial distance through which elongated rod 42 is allowed to move before causing switch button 50 to be activated, the greater the pressure range being monitored can be. However, since precision monitoring is desired, the travel distance of elongated rod 42 and the activation travel range of switch button 50 are held to a minimum. Typically, switch button 50 requires only a 0.001 to 0.002 inch travel for activation.

In its high pressure application, sensor 20 monitors pressure levels ranging between 2,000 and 4,000 psi. More importantly, these pressure levels are allowed to vary by a total of only 2% to 3%. Consequently, at a pressure level of 2,000 psi, sensor 20 must be activated to show a pressure level failure whenever the source pressure drops by only ±20 psi to ±30 psi.

In view of the very small pressure level tolerances which must be monitored, the axial travel distance of rod 42 must be minimal. In general, it has been found that the total axial movement of rod 42 must be limited to a range of between about 0.012 and 0.014 inches, while its electrical switch activation travel distance is limited to between about 0.001 and 0.002 inches in either direction, in order to provide the required sensing capabilities.

In addition, sensor 20 must be able to operate in a wide variety of applications, wherein the ambient temperatures to which sensor 20 is exposed can widely vary. Sensor 20 is constructed for maintaining its precision operation with temperatures ranging between −60° F. to 350° F., as well as at temperatures as low as −270° F. and as high as 1,000° F.

Due to the harsh ambient conditions to which sensor 20 may be exposed, one of the important factors to be considered in the construction of a precision device is the effect these wide temperature differentials have on the expansion and contraction of the materials employed in the manufacture of sensor 20. In prior art systems wherein the teaching of the present invention is not employed, expansion and contraction effects and other characteristics on the sensor components cause substantial changes in the threshold level at which these prior art sensors would activate. As a result, these prior art systems have been unable to maintain precision pressure monitoring within the desired, closely defined tolerances. However, by employing the pressure sensor of the present invention, these closely defined tolerances can be easily maintained.

As detailed above in the present invention elongated actuating rod 42 is constructed from a material which is substantially insensitive to temperature changes. In this way, elongated rod 42 remains effectively unchanged in length and diameter regardless of the ambient temperature to which actuating rod 42 is exposed. It has been found that the effect of expansion or contraction on the sensor's remaining components are effectively compensated by the temperature insensitivity of rod 42. In addition to compensating for physical expansion and contraction of the sensor's other components, rod 42 also effectively compensates for the changes caused by the temperature on the sensor's spring members.

Although the reasons for achieving compensation for the effects of expansion, contraction, and spring rate changes due to the severe temperature changes vary with construction materials used, the incorporation of temperature insensitive actuating rod 42 into sensor 20 provides the desired offsetting balance or compensation and enables the actuating pressure ranges initially set at normal ambient conditions to remain virtually intact, even though sensor 20 might be actuated at temperatures as low as −65° F. or as high 350° F.

In the preferred embodiment, the material employed for actuating rod 42 comprises invar or nickel steel. As is known, invar or nickel steel comprise about 36% nickel which imparts unique temperature insensitive characteristics to the resulting product. As a result, temperature changes have little or no effect on expansion or contraction characteristics of this material. Consequently, by employing the teaching of the present invention, sensor 20 is capable of achieving precision pressure monitoring within tight or limited tolerances, even though sensor 20 is exposed to repeated cycles of substantial temperature changes or differential and may be required to operate at either very low or very high temperature conditions.

In FIG. 2, an alternate embodiment of pressure sensor 20 is shown. In this embodiment, pressure sensor 20 comprises a differential pressure sensor, which is constructed to be connected to both a high pressure source and a low pressure source to monitor the pressure differential between these two sources. Once set, differential pressure sensor 20 activates switch means 51 into an alarm condition whenever the differential pressure rises above or falls below the pre-set, desired operating range.

As shown in FIG. 2, pressure sensor 20 comprises a housing 62 within which a first, upper pressure chamber 72 and a second, lower pressure chamber 77 are provided. As detailed below, a flexible diaphragm 84 is mounted in housing 62 in order to separate and maintain chambers 72 and 77 independent of each other.

Housing 62 may be constructed in numerous ways, without departing from the scope of this invention. However, in order to achieve a housing having the requisite strength, while also having a minimum weight, housing 62 preferably comprises an upper housing portion 63, an intermediate housing portion 64, a lower housing 65, and a switch containing housing insert 66. In the preferred embodiment, lower housing 65 peripherally surrounds and envelopes a portion of upper housing 63 with the two housing portions being integrally interconnected to each other by intermediate housing portion 64. Finally, switch containing insert 66 is secured to the opposite, upper end of housing portion 63. Preferably, each of the housing members are joined together in order to attain a substantially integral housing assembly 62.

Upper housing portion 63 comprises a central elongated wall 68 extending substantially the entire length of upper housing 63 with wall 68, terminating at its lower end in a radially extending flange 69. The interior zone established within wall 68 defines first, upper pressure chamber 72.

Lower housing 65 comprises an upstanding wall member 70 which peripherally surrounds and embraces a portion of wall 68 of upper housing 63. As clearly depicted in FIG. 2, radially extending flange 69 extends from wall portion 68 of upper housing 63 into secure, embracing interengagement with wall 70 of lower housing portion 65.

Securely mounted to lower housing 65 is a mounting plate 78, which incorporates a through hole 79. In addition, substantially circular diaphragm 84 is securely mounted by its outer peripheral edge between radially extending flange 69 of upper housing 63 and mounting plate 78 of lower housing 65. By securely affixing the outer peripheral edge of diaphragm 84 between these two adjacent surfaces, a pressure resisting connection is made and the two separate and distinct pressure chambers 72 and 77 are formed.

As best seen in FIG. 3, in this embodiment of the present invention, diaphragm 84 is welded to mounting plate 78, in order to assure that a leak-free pressure tight connection is established therebetween and the two separate pressure chambers are established. By employing this construction, minimum dimensional requirements are easily met and the need for a conventional "0"-ring is eliminated. By welding diaphragm 84 directly to plate 78 about the outer peripheral surfaces thereof, the requisite leak-free connection is attained.

As best seen in FIGS. 2 and 3, diaphragm 84 is welded on one surface to plate 78, while flange 69 of housing portion 63 peripherally surrounds and abuttingly, sealingly engages the other surface of diaphragm 84. In addition, a pressure zone or chamber 81 is established between diaphragm 84 and plate 78. However, since plate 78 incorporates through hole 79, the pressure level in chamber 77 and in zone 81 are identical.

In order to provide the required connections for receiving the source pressures, lower housing portion 65 incorporates portals 75 and 76, which are constructed for easy interconnection with the pressure sources to be monitored. In the preferred embodiment, portal 75 is connected to the low pressure source and portal 76 is connected to the high pressure source. As a result, pressure chamber 77 forms the high pressure chamber, while chamber 72 forms the low pressure chamber. In order to deliver the low pressure to chamber 72, a chamfer 83 is formed in the outer peripheral edge of plate 78. In this way, the low pressure received at port 75 passes around the edge of plate 78 and is supplied directly to chamber 72.

In order to assure that pressure chambers 72 and 77 are leak-free and are maintained at the precise pressure level as the pressure source for each chamber, housing 62 incorporates 0-ring seals 80 at various positions. In this way, sensor 20 is able to provide precision pressure level monitoring.

By employing this construction, with only the outer peripheral edge of diaphragm 84 securely affixed between cooperating mating components of housing 62, diaphragm 84 is free to axially translate in response to pressure changes in chamber 72 or chamber 77. Consequently, diaphragm 84 effectively monitors the difference between the high pressure source and the low pressure source.

Since chamber 77 is connected to the high pressure source, and chamber 72 is connected to the low pressure source, the pressure acting upon the lower face of diaphragm 84 is greater than the pressure acting on the opposed, top face of diaphragm 84. In order to counteract this pressure differential and provide the desired control means for setting the differential pressure range in which diaphragm 84 is to operate, a calibration pressure control assembly 88 is mounted within housing portion 63 of housing 62.

As shown in FIG. 2, calibration pressure control assembly 88 comprises, in addition to diaphragm 84, an adjustment control fitting 89, an elongated, axially movable rod 90, a diaphragm stop member 92, and spring means 91 preferably mounted in compression between diaphragm stop member 92 and fitting 89. In this embodiment, elongated axially movable rod 90 is mounted within a through hole formed in fitting 89 which allows the free axial movement of rod 90 therein. In addition, the base of rod 90 rests on diaphragm stop member 92, which rests on the top surface of diaphragm 84 and moves in response to the movement of diaphragm 84. In this way, rod 90 is axially guided by fitting 89 and moves in response to the movement of diaphragm 84 and diaphragm stop member 92.

In order to provide the desired adjustability to sensor 20, fitting 89 is threadedly engaged with wall 68 of housing portion 63. In this way, by rotating fitting 89, the compression forces of spring 91 acting on diaphragm 84 and diaphragm stop member 92 can be either increased or decreased. As a result, the precise desired pressure responsive sensitivity can be imparted to pressure sensor 20.

In this embodiment, housing insert 66 of sensor 20 incorporates a switch button 50 as part of switch means 51 which operates in a similar manner to switch button 50 of the embodiment shown and detailed above. In monitoring the differential pressures, switch button 50 is activated and set in its "normal" position whenever the high and low pressures are both connected to sensor 20 and in their normal operating range. In addition, whenever the low pressure source increases or the high pressure source decreases, elongated rod 90 moves axially away from switch button 50, activating an alarm condition.

As shown in FIG. 2, the distal end of elongated rod 90 is in direct contact with switch button 50 through a wobble plate assembly 53. Wobble plate assembly 53 is employed in order to hermetically seal switch means 51 in housing insert 66, completely free from any adverse effects that might be caused by the fluids being monitored. Since all fluids are prevented from reaching switch means 51, a conventional switch member 50 may be employed, thereby further enhancing the system's reliability and reasonable cost. By employing wobble plate assembly 53, the desired sealing is achieved, and switch button 50 is directly controlled by the movement of rod 90.

Wobble plate assembly 53 incorporates sealing plates 60 and 61 between which a thin, flexible contact wafer plate 57 is secured. In addition, sealing plates 60 and 61 each incorporate a small hole formed therein, which holes are axially aligned to expose a small portion of contact wafer 57. With this assembly, the desired hermetic sealing of switch means 51 in insert 66 is attained.

In order to attain the requisite remote control of switch button 50 by rod 90, wobble plate assembly 53 also incorporates movable arms 58 and 59 securely welded to opposed sides of contact wafer 57 and plates 60 and 61 by weld means 54. Due to this integrated construction, when arm 59 is deflected, arm 58 also deflects a substantially identical amount, and when the deflection force is removed, both arms 58 and 59 return to their original positions. By employing this construction, the differential pressure can be precisely measured in very specific pressure ranges, even under adverse temperature conditions.

In order to attain the desired signal to a remote location, switch button 50 is placed in its "normal" operating position, whenever the pressures have been applied to the receiving zones and the desired differential pressure has been established. As long as this differential pressure remains within the desired tolerance, the "normal" position remains and no alarm signals are initiated. In this configuration, elongated rod 90 is in contact with arm 59 to a sufficient extent to cause arm 58 to engage switch button 50 and place switch means 51 in its "normal" activated state.

If the high pressure rises or the low pressure fails a sufficient amount to cause the differential pressure being sensed to go beyond the desired threshold range, elongated rod 90 moves away from wobble plate 53, causing arms 58 and 59 to move away switch button 50. This movement causes switch button 50 to move from its normal condition into its alarm condition, initiating a signal to the remote location that the pressure differential is out of the desired range.

In this way, the desired differential pressures are continuously monitored and an alarm condition is provided when the differential pressure differs from the precise, limited pressure range within which the system must operate. In addition, by employing the teaching of the present invention, pressure sensors can operate under adverse temperature conditions with temperatures ranging as low as −270° F. or as high as 1,000° F., while still maintaining the precise, limited pressure tolerances imposed upon the system.

In this embodiment of sensor 20, elongated actuating rod 90 comprises invar or nickel steel, in order to provide sensor 20 with the desired temperature insensitive characteristics. As detailed above in regard to FIG. 1, by employing a temperature insensitive actuating component, elongated rod 90 effectively compensates for the expansion, contraction, and spring rate changes experienced by the sensor's other components and provides the desired operation within the extremely limited tolerance range.

Consequently, even though differential pressure sensor 20 is set at ambient conditions for activation whenever the differential pressure being monitored exceeds or falls below the pre-set threshold range, the differential pressure sensor of the present invention will maintain this pre-set threshold level within precise, limited tolerances, even though sensor 20 is exposed to temperature extremes and is required to operate under such adverse temperature conditions. It has been found that the sensor of this invention is able to maintain the differential pressure at less than 15 ± 1 psi. As with the previous embodiment, differential pressure sensor 20 has been found to be capable of maintaining the close, precision tolerances throughout its normal temperature range of −65° F. to 350° F., as well as providing the teaching for successful operation at temperatures as low as −270° F. and as high as 1,000° F.

In FIG. 4, the preferred embodiment construction details for manufacturing a bellows is shown in detail. In this preferred embodiment, bellows 100 is constructed by machining a conventional tubular member. Since bellows are presently constructed using high pressure, hydroforming metal technology and electro-deposition chemistry, these prior art bellows are extremely expensive. However, by employing the teaching of the present invention, a bellows can be constructed by machining at a substantially lower cost.

Depending upon the response characteristic desired, the thickness of the tubular material is limited only by the tolerances of the machining operation. As will be apparent from the following description, as long as the equipment being employed can maintain a desired wall thickness, tube members having virtually any thickness can be employed with the teaching of this invention.

In addition, the present invention can be employed to attain a bellows having any desired length, as well as one which is either open ended and closed ended. If a closed end bellows is desired, the base of the bellows preferably comprises an integral portion of the original tube. In this way, a separate base component is avoided and the bellows comprises a single integral unit.

By employing the teaching of this invention, any desired uniquely configured, "tailor-made" bellows can be constructed which previously were unattainable or were prohibitively expensive. In particular, precisely desired spring rates or spring dampening or controlling effects can be attained. In addition, bellows having two different spring rates, for providing a unique dual-phase operation may be created.

As will be apparent from the following detailed disclosure, one way in which these multi-faceted, "tailor-made" bellows can be constructed is to employ totally different materials, which are subsequently secured together to attain the final, integral bellows construction. In this way, a soft, easily compressed material can be employed along with a substantially stiffer material having a totally different spring rate.

Furthermore, spring rates can also be controlled, using the present invention, by employing different convolution configurations within the same bellows construction. As will be readily apparent from the following detailed disclosure, the bellows can be employed using the teaching of this invention by combining convolutions of different depths or different wall thicknesses in the same bellows. In this way, specifically desired spring rates and performance characteristics can be attained from a single bellows construction which can be manufactured expeditiously and at a reasonable cost.

By referring to FIG. 4, and the following detailed disclosure, the construction of the machined bellows of the present invention can best be understood. For exemplary purposes only, and not in any way intending to be limited thereby, the bellows depicted in FIG. 4 comprises a conventional construction having uniform convolutions and wall thicknesses throughout its entire length. However, as detailed above, the present invention can be employed to attain bellows constructions substantially different than the single example depicted in FIG. 4.

In order to attain the desired construction of a machined bellows in accordance with the teaching of the present invention, the base member is first machined externally to attain the desired external annular recesses. As shown in FIG. 4, this external machining operation, which can be attained by using conventional lathe operations, would cut the base member to the desired overall shape and then form externally open annular recesses 101 in the outer peripheral surface.

Once the external configuration of bellows 100 is attained, the bellows is then mounted for forming the internal annular recesses. As shown in FIG. 4, the internal annular recesses are created by employing a specially constructed machine tool 102 which incorporates an elongated shaft 103 terminating at its distal end with a cutting edge 104. By bringing the inside surface of bellows 100 into cutting engagement with cutting edge 104 of machine tool 102, internal annular recesses 105 are formed.

In the preferred process, internal recesses 105 are expeditiously attained by mounting bellows 100 for rotation about its central axis and moving either bellows 100 and/or machine tool 102 relative to each other in a plane substantially perpendicular to the central axis of bellows 100 in order to cut one internal recess 105. Each subsequent internal recess 105 is formed in a similar manner, after axially moving machine tool 102 into the next position.

The height of each internal recess 105 is precisely controlled, since the height of each internal recess 105 substantially equals the height of the cutting surface of cutting edge 104 of machine tool 102. In addition, by precisely controlling the movement of machine tool 102 relative to bellows 100, the depth of each recess 105 is also precisely controlled.

By employing the teaching of this invention, bellows 100 may be machined with any desired recess configuration within machining tolerances and capabilities of the construction detailed herein. By varying the height of the cutting edge 104 of machine tool 102, internal recesses of any desired height are attained. Furthermore, by varying the distance between cutting edge 104 and the central axis of shaft 103, the maximum depth of each internal recess 105 is also controlled. In this way, internal recesses 105 and mating external recesses 101 are constructed in any desired configuration, in order to attain a particular spring force, bellows dampening control, or variable rate bellows.

Furthermore, any desired diameter bellows can be constructed using the present invention. As will be readily apparent from the preceding description, the only limiting factor on the minimum diameter of bellows 100 is that the internal diameter of bellows 100 must be greater than the rotating diameter of cutting blade 102. Of course, this requirement is necessitated in order to enable machine tool 102 to be inserted into bellows 100 and form the desired internal recesses 105.

In addition, any desired material may be employed, depending upon the final characteristics desired. It has been found that aluminum and aluminum alloys may be employed, with final wall thicknesses of about 0.010 inches being easily attained for the final bellows configuration. Of course, wall thicknesses will vary depending upon the strength and the machining characteristics of the material being used.

By employing this invention for a machined bellows, any bellows configuration, whether it be open ended or closed end, can be quickly and easily constructed to any desired specification in a manner which achieves a relatively inexpensive, easily-constructed bellows. As a result, tolerance requirements can be met and miniature bellows are now able to be constructed inexpensively for use in any desired application.

It will thus be seen that the objects set forth above, among those made apparent from the preceding description are efficiently attained and, since certain changes may be made in the above construction without departing from the scope of the invention, it is intended that all matter attained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described my invention, what I claim as new and desire to secure by Letters Patent is:

1. A sensor for monitoring the pressure level of a desired pressure source and providing a signal whenever the pressure source level differs from a pre-set level even when exposed to extreme temperature conditions, said sensor comprising:
   A. a housing having at least one pressure receiving inlet for connection to the pressure source being monitored;
   B. switch means
      a. mounted in the housing, and
      b. adapted to provide an output signal when activated for indicating a pressure level change outside of the pre-set parameters; and
   C. a temperature compensating pressure level monitoring-actuator assembly incorporating
      a. an elongated actuating rod
         (1) mounted for axial movability in response to changes in the level of the source pressure,
         (2) connected at one end to the switch means for activation thereof whenever the source pressure differs from the pre-set level, and
         (3) formed from temperature insensitive material, whereby changes in the ambient temperature has negligible effect on the expansion or contraction of said rod, and
      b. movement control means
         (1) connected to the actuating rod, and
         (2) providing an adjustable biasing force to said rod for controllably setting the forces required to move the elongated rod from its first monitoring position to its second alarm-activating position;

whereby an effective precision temperature insensitive sensor is attained which continuously monitors a pressure source within limited pre-set ranges and provides an output indication whenever the source pressure deviates from the pre-set level regardless of temperature conditions to which the sensor is exposed.

2. The pressure sensor defined in claim 1, wherein the movement control means is further defined as comprising
   (3) a rod supporting member, mounted in the housing for movement relative to the central axis of the housing in response to changes in the pressure level being monitored, and supportingly holding the elongated rod for controlling the axial movement thereof.

3. The pressure sensor defined in claim 2, wherein said movement control means further comprises
   (4) spring means operatively connected at one end thereof to the rod support member for opposing axial movement of the rod support member toward said spring means, and
   (5) adjusting means rotationally mounted in the housing in contacting engagement with the opposed end of the spring means for controllably adjusting the force of the spring means on the rod support member by rotational movement thereof.

4. The pressure sensor defined in claim 3, wherein said pressure sensor is further defined as being connected to a single pressure source for monitoring the pressure level within a pre-set range, and the rod support member is further defined as comprising an elongated axially translatable holder peripherally surrounding and containing a substantial length of said elongated rod, with said holder being further defined as comprising
   i. a pressure receiving surface formed on one end thereof directly adjacent the pressure receiving inlet, and
   ii. a bellows peripherally surrounding a portion of said rod support member with one end thereof mounted to said rod support member, and the opposed end thereof mounted directly to the housing, whereby the axial movement of the rod support member is further controlled and restricted by the compression resistant forces of said bellows.

5. The pressure sensor defined in claim 4, wherein the pressure being monitored ranges between about 2,000 and 4,000 psi and the pre-set range in which said pressure is maintained ranges between one and three percent of said pressure.

6. The pressure sensor defined in claim 4, wherein said bellows is further defined as comprising a machined bellows formed from an open-ended elongated tube with the external annular recesses cut by conventional lathe operation and the internal annular recesses cut by employing a cutting tool constructed for forming each of said internal recesses.

7. The pressure sensor defined in claim 4, wherein said bellows is further defined as being manufactured by employing the steps of:
   A. cutting a hollow tube to a desired length;
   B. forming a plurality of annular recesses in the external surface of the tube, each of said recesses being parallel to the other and lying in a plane substantially perpendicular to the central axis of the tube; and
   C. forming a plurality of annular recesses in the internal surface of the tube, parallel to each other and in alternating selectively spaced relationship to the external recesses.

8. The pressure sensor defined in claim 3, wherein said pressure sensor is further defined as being connected to a single pressure source for monitoring the pressure level within a pre-set range, and the movement control means is further defined as comprising
   (6) a substantially circular diaphragm
      (a) affixed about its outer peripheral surface to said housing,
      (b) defining on one side thereof a pressure receiving chamber connected to the pressure receiving inlet, (c) being axially movable substantially along the central axis of said housing in response to changes in either the first or the second pressure chambers, and (d) controllably moving the elongated actuating rod in response to the movement of said diaphragm, whereby the pressure sensor is capable of monitoring the level of the pressure source and actuating the sensor whenever the pressure level differs from the pre-set desired 9. The pressure sensor defined in claim 8, wherein the housing is further defined as comprising a diaphragm support plate and the diaphragm is further defined as being welded to said support plate about one of its outer peripheral surfaces, thereby assuring that said pressure receiving zones is completely sealed without requiring separate sealing means.

10. The pressure sensor defined in claim 8, wherein the rod supporting member is mounted on the diaphragm for controlled movement thereof and of the rod in response to axial movement of the diaphragm.

11. The pressure sensor defined in claim 8, wherein said switch means is defined as being hermetically sealed in a separate zone to prevent fluid in the housing from contacting the switch means.

12. The pressure sensor defined in claim 3, wherein said sensor is constructed for monitoring differential pressures, the housing is constructed with two pressure receiving inlets and movement control means is further defined as comprising (6) a substantially circular diaphragm
(a) affixed about its outer peripheral surface to said housing,
(b) defining on one side thereof a first pressure receiving chamber and on the opposed side thereof a second pressure receiving chamber,
(c) being axially movable substantially along the central axis of said housing in response to changes in either the first or the second pressure chambers, and
(d) controllably moving the elongated actuating rod in response to the movement of said diaphragm, whereby the differential pressure sensor is capable of monitoring the difference between the two pressure sources and actuating the sensor whenever the differential pressure therebetween differs from the pre-set desired range.

13. The pressure sensor defined in claim 12, wherein the housing is further defined as comprising a diaphragm support plate and the diaphragm is further defined as being welded to said support plate about one of its outer peripheral surfaces, thereby assuring that said pressure receiving zones is completely sealed without requiring separate sealing means.

14. The pressure sensor defined in claim 12, wherein the rod supporting member is mounted on the diaphragm for controlled movement thereof and of the rod in response to axial movement of the diaphragm.

15. The pressure sensor defined in claim 12, wherein said switch means is defined as being hermetically sealed in a separate zone to prevent fluid in the housing from contacting the switch means.

16. The pressure sensor defined in claim 12, wherein the switch means is further defined as being sealed by employing a wobble plate, thereby providing accurate precision control of said switch means by movement external of said sealed switch-containing zone.

17. The pressure sensor defined in claim 1, wherein said elongated actuating rod is further defined as being formed from steel having a nickel content of about 36%.

18. The pressure sensor defined in claim 1, wherein said actuating rod is further defined as being formed from invar.

19. The pressure sensor defined in claim 1, wherein said elongated actuating rod experiences negligible contraction at temperatures at least as low as −65° F. and experiences negligible expansion at deviated temperatures as high as 350° F., whereby said elongated actuating rod effectively compensates for temperature induced changes in the sensor's other component parts and assures continuous, precision monitoring at the pre-set pressure range regardless of the ambient operating temperature.

* * * * *